United States Patent [19]

Pidgeon

[11] Patent Number: 4,787,602

[45] Date of Patent: Nov. 29, 1988

[54] TETHERS/ANCHORAGE ASSEMBLIES

[75] Inventor: Andrew D. Pidgeon, Marton, England

[73] Assignee: Glasdon Limited, Blackpool, England

[21] Appl. No.: 44,724

[22] Filed: May 1, 1987

[51] Int. Cl.4 .............................................. A01G 17/06
[52] U.S. Cl. ......................................... 256/23; 49/10; 403/348; 114/108
[58] Field of Search ............................. 256/23; 49/10; 248/222.4, 223.1, 223.2, 328; 24/590; 114/108; 403/348

[56] References Cited

U.S. PATENT DOCUMENTS 2,151,837  3/1939  Burke .................... 24/590 X

FOREIGN PATENT DOCUMENTS 1531724  11/1978  United Kingdom .
1531725  11/1978  United Kingdom .

*Primary Examiner*—Andrew V. Kundrat
*Attorney, Agent, or Firm*—Roylance, Abrams, Berdo & Goodman

[57] ABSTRACT

A tether anchorage is provided for supporting barrier planks of free standing posts of portable barrier systems wherein an elongated plug with a head, flat intermediate tongue and body has a tether secured to one end of the plug and with the head of the plug being receivable in a slot and apertures in the wall of the post to suspend the plank by the tether.

8 Claims, 5 Drawing Sheets

TETHERS/ANCHORAGE ASSEMBLIES

BACKGROUND OF THE INVENTION

1. Field of the Invention

This invention relates to tethers/anchorage assemblies and is particularly although not exclusively applicable to tether/anchorage assemblies for supporting barrier planks on free-standing posts of temporary portable barrier systems.

2. Background Prior Art

U.K. Patent Specifications Nos. 1,531,724 and 1,531,725 disclose temporary/portable barrier systems comprising free-standing upright posts from which barrier planks are suspended by means of tethers connected to the ends of the planks and formed with heads which lock in "key hole" shaped apertures in the walls of the posts. Such barrier systems are readily assembled and dis-assembled and have provided highly effective temporary/portable barriers which are widely used for segregating off road works sites in roadways and on footpaths and for other similar purposes. A disadvantage of the arrangements shown is that because the planks can be readily assembled on the posts, they can easily be readily dis-assembled by un-authorised third parties. Thus planks can be removed illegitimately leaving a site of a road works un-protected.

SUMMARY OF THE INVENTION

The invention provides a tether/anchorage assembly comprising an elongate plug having a body to receive an end of a tether extending transversely to the lengthwise direction of the plug, a head and a flat tongue extending between and connecting the head to the body, the tongue being narrower than the head and the body, the anchorage having a wall with a slot open at one end to permit engagement of the tongue in the slot with the head on the opposite side of the anchorage wall to the body and an aperture at the other end of the slot to receive the tongue but to prevent extraction of the plug from the wall in the lengthwise direction of the plug but permitting the tongue to turn in the aperture to allow the tongue to be rotated out of alignment with the slot to prevent the plug from being dis-engaged from the anchorage wall, the connection of the tether to the plug and the plane of the tongue being oriented so that when the tether hangs dependent from the plug in the anchorage wall, the tongue is out of alignment with the slot.

Preferably the slot extends vertically, said one open end is located at the upper end of the slot and the aperture is located at the lower end of the slot and the tether, where it is connected to the plug, extends transversely to a plane containing the tongue whereby the tongue extends in a horizontal plane when the tether depends downwardly from the plug engaged in the anchor wall.

The open end of the slot may be provided by a further aperture in the anchor wall larger in cross-section than the first mentioned aperture to permit the head of the plug to pass through the anchor wall and enable the tongue of the plug to be engaged in the slot leading from the further aperture.

In any of the above arrangements the head may have an encircling ring rotatable about the head and a leg may be provided on the ring which extends along the plug over the gap created by the tongue between the head and body, the leg being located on the trailing side of the plug in alignment with the tongue as the tongue is moved along the slot in the anchor wall and remaining in the slot when the tongue is rotated out of alignment with the aperture to obscure the tongue when sighted along the slot.

The invention also provides a free standing barrier system comprising portable upright posts with planks suspended therefrom, wherein each plank has the tethers connected to each end thereof and connected to a pair of said posts by tether/anchorage assemblies in accordance with any of the above arrangements.

DESCRIPTION OF THE PREFERRED EMBODIMENTS

Figure 1:
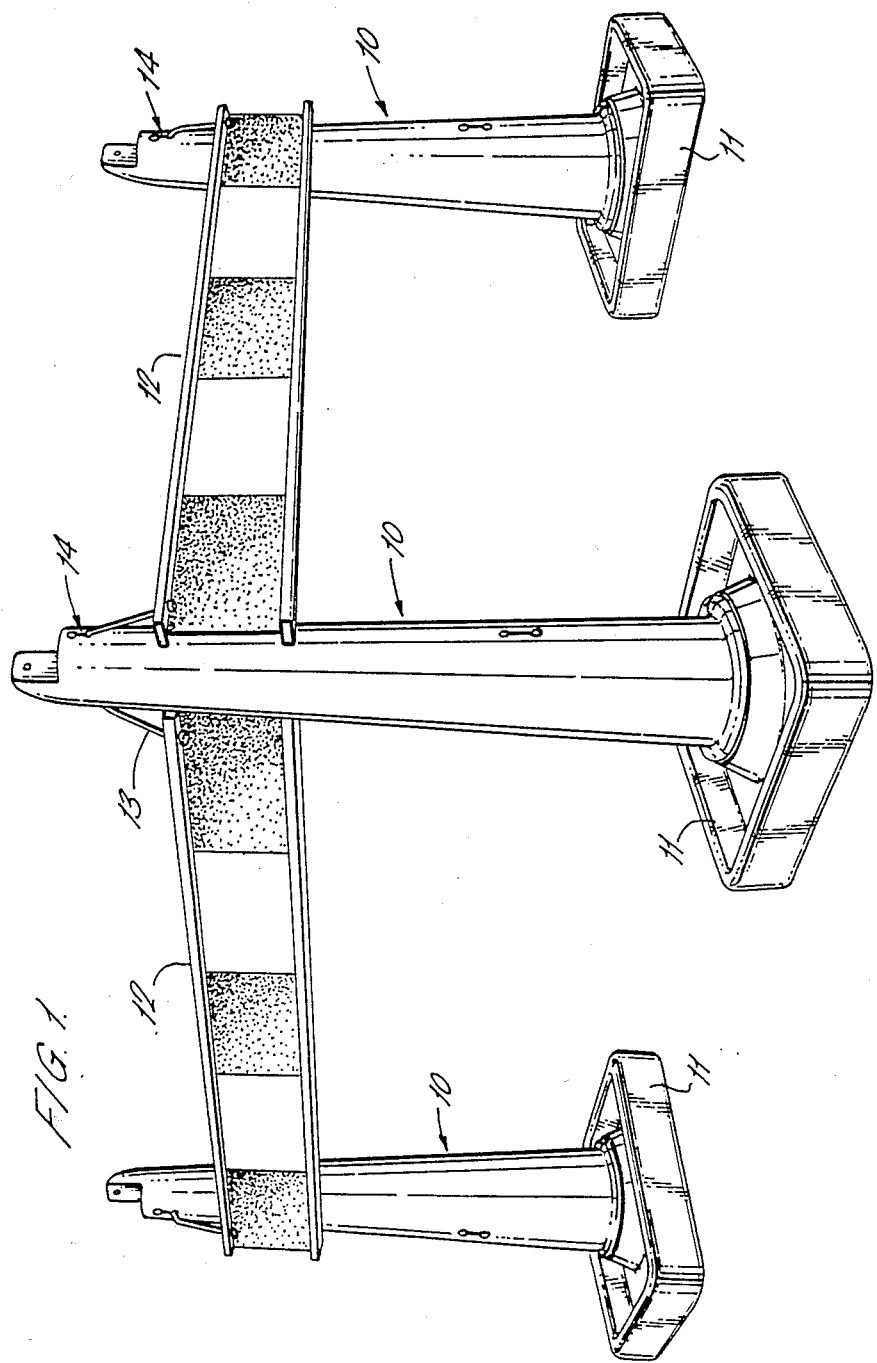
FIG. 1 is a perspective view of part of a portable barrier system comprising free standing upright posts and barrier planks supported on the posts on tethers anchored to the posts.

Referring firstly to FIG. 1 of the drawings, there is shown a part of a transportable barrier assembly comprising upright posts 10 having bases 11. Horizontal barrier planks 12 extending between adjacent posts with tethers 13 engaged in anchorages indicated at 14 in the upper parts of the walls of the posts. The anchorage of a tether to a post wall will now be described in greater detail with reference to FIGS. 2 to 7.

Figure 2:
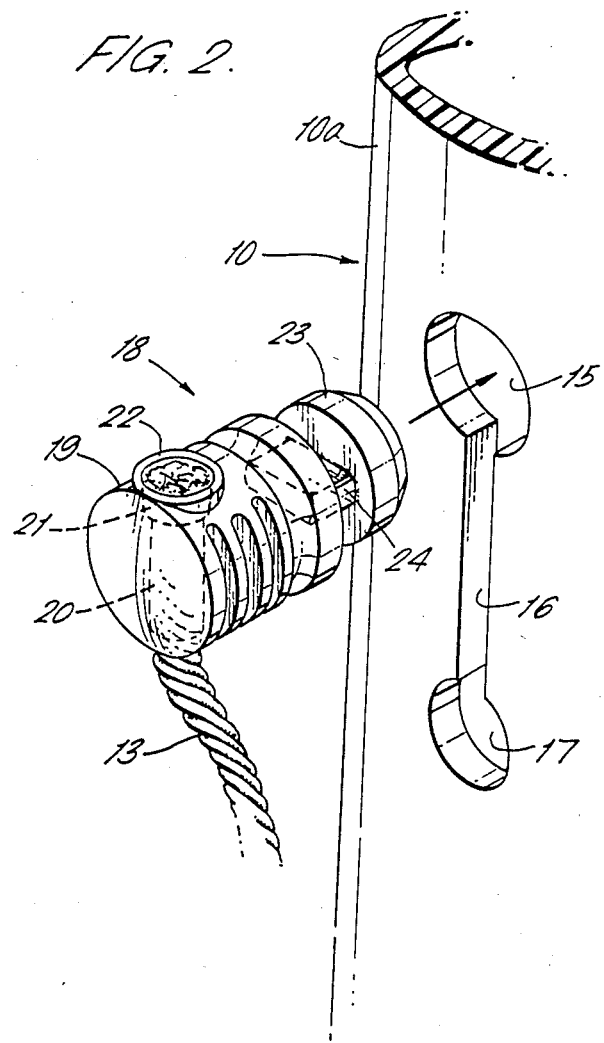
FIG. 2 is a perspective view of the connection of an end of a tether to an anchorage on a post by means of a plug on the tether engaged in the post.
Figure 3:
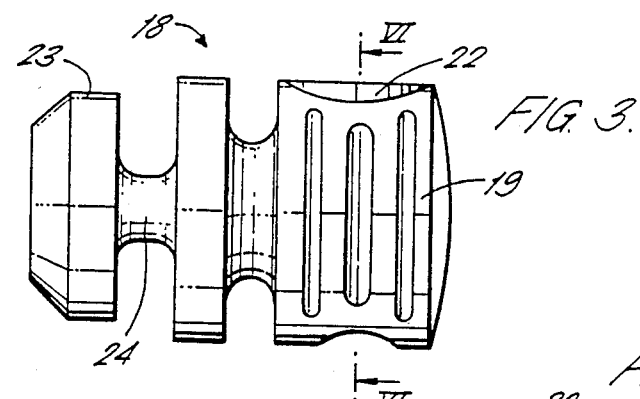
FIG. 3 is a side view of the plug.
Figure 4:
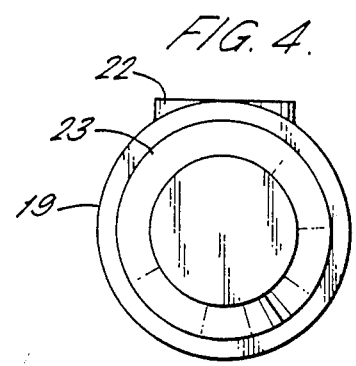
FIG. 4 is an end view of the plug.
Figure 5:
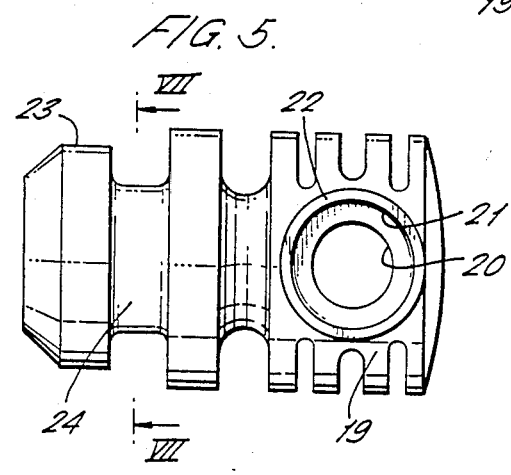
FIG. 5 is a plan view of the plug.
Figure 6:
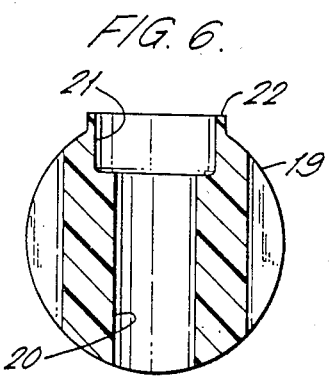
FIG. 6 is a section on the line 6—6 on FIG. 3.
Figure 7:
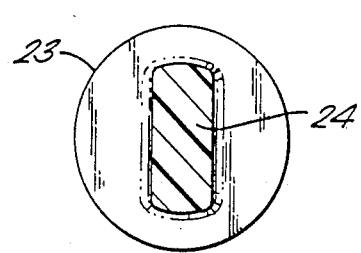
FIG. 7 is a section on the line 7—7 of FIG. 5.

FIG. 2 shows an upper part 10a of the wall of the post 10 formed with a "key hole" shaped opening consisting of an upper larger circular aperture 15 a narrow slot 16 extending vertically downwardly from the aperture 15 and terminating in a second smaller diameter aperture 17. The tether 13 is connected to an elongate cylindrical plug indicated at 18 and comprising a cylindrical body 19 having a transversely extending bore 20 with a counter-bore 21 formed at one end thereof with an upstanding encircling rim 22 formed around the counter bore on the side of the body. The end part of the tether 13 extends through the bore 20 and the end of the tether is fused and compressed to form an enlarged head filling the counter-bore to retain the tether in the bore. The plug further comprises a cylindrical head 23 connected to the body by a flat tongue 24 which is somewhat narrower than the head and body. As can be seen in FIG. 2, the tether 13 extends from the body 19 transversely to a plane containing the tongue 24 so that when the tether extends generally downwardly from the body, the tongue 24 extends generally horizontally.

The connection of the plug to the anchorage provided in the wall 10a is made by inserting the head 23 in the aperture 15 with the tongue 24 oriented vertically. In this position, the tether 13 will extend horizontally from the body 19.

The plug is attached to the post in the following manner. The head 23 of the plug is inserted through the aperture 15 to bring the tongue 24 into alignment with the wall 10a. The plug is then rotated until the tongue 24 is vertically orientated opposite the slot 16 and the tether 13 will then extend horizontally from the body 19. The tongue is then inserted into the slot 16 and moved down the slot and into the aperture 17. The plug is then rotated again to bring the tongue 24 into the horizontal position with the tether 13 extending downwardly from the plug and the plank suspended on the tether. The head 23 of the plug is of larger diameter than the aperture 17 so that the plug is retained in the aperture and since the tongue 24 is located in its horizontal attitude, the plug cannot be drawn up the slot 16. The weight of the plank suspended from the tether 13 will hold the plug naturally in that attitude. A third party casually trying to detach the plank from the post and trying to do so simply by lifting the plug up the slot 16 would be un-successful. The plug can only be detached by rotating it through ninety-degrees to bring the tongue 24 into alignment with the slot 16 and then drawing the plug up the slot into the aperture 15 from where it can be extracted.

In a modification of the above arrangement, a reduction is made in the width of the slot 16 to part way along the slot provide an interference fit for the correctly aligned tongue and thereby to offer resistance at that location to its passage through the central slot.

Figure 8:
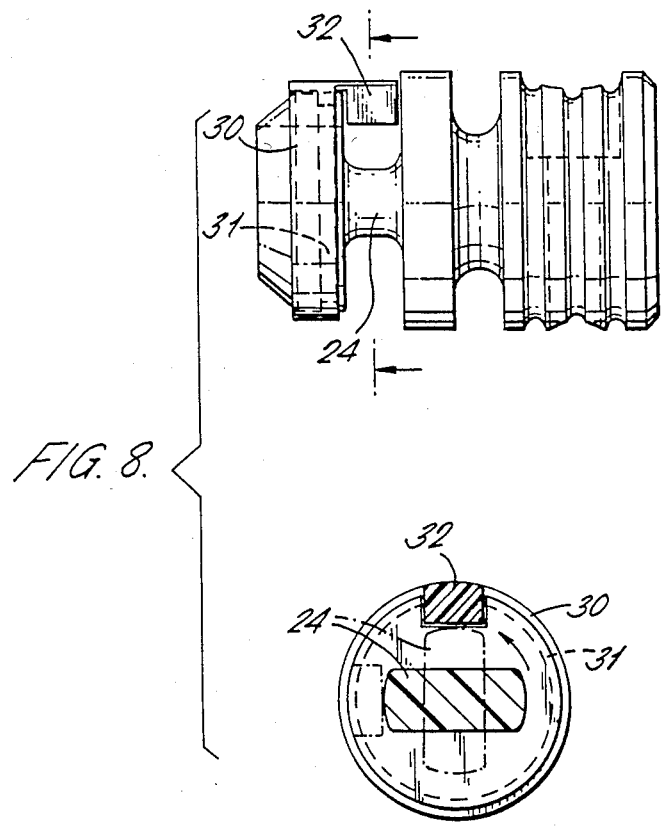
FIG. 8 illustrates a modified form of the plug in side and section views.

In a further refinement shown in FIG. 8, the head of the plug is provided with an encircling ring component 30 which is a snap fit in a peripheral groove 31 around the head part to permit the ring to rotate freely with respect to the head. Mounted on or integral with the ring is a projecting leg 32 which extends over the gap between the head and body part containing the tongue. The leg is aligned with the tongue on the trailing side of the plug as the plug is moved down the slot 16 and remains engaged in the slot when the tongue has moved into the aperture 17 at the bottom of the slot. The leg blocks the slot and therefore obstructs sight of the tongue in the aperture 17 to obscure the function of the tongue to a third party looking along the slot and to prevent deduction of the manner in which the plug could be dis-engaged from the anchorage.

Figure 9:
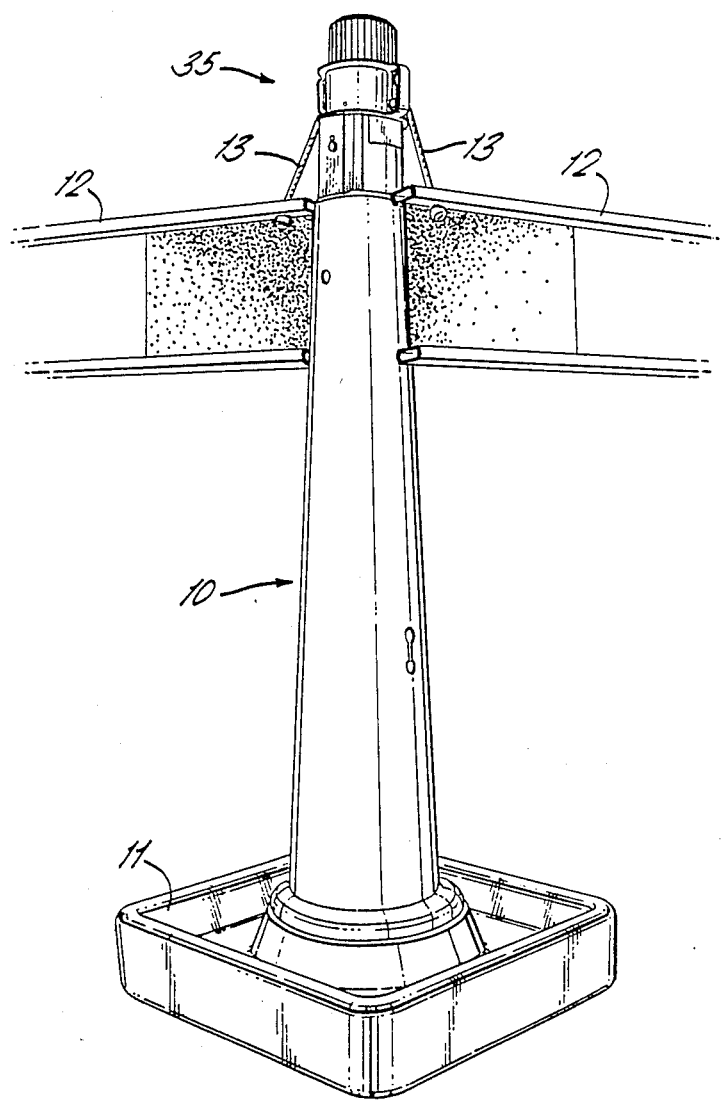
FIG. 9 illustrates a further modified form of the system.

In a further arrangement shown in FIG. 9, the pair of spaced holes and slot to receive the plug are provided in a lamp body 35 secured to the top of the post 12.

I claim:

1. A tether/anchorage assembly, comprising: an elongate plug having a body to receive an end of a tether extending transversely to the lengthwise direction of the plug, a head, and a flat tongue extending between and connecting the head to the body, the tongue being narrower than the head and the body, the anchorage having a wall with a slot extending between spaced first and second apertures, the first aperture being larger than the second aperture to pass both the head and tongue of the body to enable the latter to be engaged in the slot with the head of the plug on the opposite side of the anchorage wall to the body of the plug, said second aperture at the other end of the slot being smaller than the first aperture and being sufficiently large to receive and allow the tongue to rotate in the aperture but not to pass the head of the plug, whereby the tongue can be engaged in the second aperture and rotated out of alignment with the slot to prevent the plug from being disengaged from the anchorage wall, the connection of the tether to the plug and the plane of the tongue being oriented so that when the tether hangs dependent from the plug in the anchorage wall, the tongue is out of alignment with the slot.

2. An assembly as claimed in claim 1 wherein the slot extends vertically, said first aperture is located at the upper end of the slot and the second aperture is located at the lower end of the slot and the tether, where it is connected to the plug, extends transversely to a plane containing the tongue whereby the tongue extends in a horizontal plane when the tether depends downwardly from the plug engaged in the anchorage wall.

3. An assembly as claimed in claim 1, wherein the slot is formed with a constriction between said apertures to resist free movement of the tongue along the slot.

4. An assembly as claimed in claim 1, wherein the tether is connected to one end of a barrier plank and the anchorage wall is located on or forms part of a free standing post for supporting the barrier plank.

5. A tether/anchorage assembly, comprising: an elongate plug having a body to receive an end of a tether extending transversely to the lengthwise direction of the plug, a head and a flat tongue extending between and connecting the head to the body, the tongue being narrower than the head and the body, the anchorage having a wall with a slot open at one end to permit engagement of the tongue in the slot with head on the opposite side of the anchorage wall to the body and an aperture at the other end of the slot to receive the tongue but to prevent extraction of the plug from the wall in the lengthwise direction of the plug but permitting the tongue to turn in the aperture to allow the tongue to be rotated out of alignment with the slot and thereby prevent the plug from being dis-engaged from the anchorage wall, the connection of the tether to the plug and the plane of the tongue being orientated so that when the tether hangs dependent from the plug in the anchorage wall, the tongue is out of alignment with the slot, and the head having an encircling ring rotatable about the head and a leg provided on the ring which extends along the plug over the gap created by the tongue between the head and body, the leg being located on the trailing side of the plug in alignment with the tongue as the tongue is moved along the slot in the anchorage wall and remaining in the slot when the tongue is rotated in the aperture out of alignment with the slot to obscure the tongue when viewed along the slot.

6. An assembly as claimed in claim 5 wherein the slot extends vertically, said one open end is located at the upper end of the slot and the aperture is located at the lower end of the slot and the tether, where it is connected to the plug, extends transversely to a plane containing the tongue whereby the tongue extends in a horizontal plane when the tether depends downwardly from the plug engaged in the anchorage wall.

7. An assembly as claimed in claim 5 wherein the slot is formed with a constriction between said one end and the aperture at the other end to resist free movement of the tongue along the slot.

8. An assembly as claimed in claim 5 wherein the tether is connected to one end of a barrier plank and the anchorage wall is located on or forms part of a free standing post for supporting the barrier plank.

* * * * *